(12) United States Patent
Wood

(10) Patent No.: US 6,215,203 B1
(45) Date of Patent: Apr. 10, 2001

(54) EFFICIENCY ELECTRICAL ENERGY DEVICE

(76) Inventor: Sylvester Wood, 504 W. Main St., Weatherly, PA (US) 18255

( * ) Notice: Subject to any disclaimer, the term of this patent is extended or adjusted under 35 U.S.C. 154(b) by 0 days.

(21) Appl. No.: 09/375,918

(22) Filed: Aug. 17, 1999

(51) Int. Cl.[7] .................................................. H02B 1/24
(52) U.S. Cl. ................................................. 307/127; 304/125
(58) Field of Search ................................... 307/127, 126, 307/125, 116, 2; 323/239; 363/79

(56) References Cited

U.S. PATENT DOCUMENTS 5,754,036 * 5/1998 Walker .................................. 323/237
5,925,998 * 7/1999 Olson .................................. 318/484

OTHER PUBLICATIONS

GE SCR Manual, Second Edition, pp. 171–173, Jan. 1961.*

* cited by examiner

Primary Examiner—Josie Ballato
Assistant Examiner—Robert L. Deberadinis
(74) Attorney, Agent, or Firm—McNess, Wallace & Nurick; Mitchell A. Smolow

(57) ABSTRACT

A power supply circuit for conducting current from an ac voltage source to an associated electrical load having a power supply circuit for feeding current to the load in alternate half cycles. The circuit comprises in combination with an ac voltage source and first circuit for conducting current in one direction through the load in a first half cycle and second circuit for conducting current through the load in the opposing direction in a second half cycle, the first and second circuit being responsive to the positive and negative cycling of the ac voltage source; a first switching control responsive to the positive half of the sinusoidal voltage waveform from the ac voltage source for energizing the first circuit and a second switching control responsive to the negative half of the sinusoidal voltage waveform from the ac voltage source for energizing the second circuit. The first and second switching control each comprises a transformer coupling the ac voltage source to the switching control for switching the switching control to its conducting condition such that a complete sinusoidal waveform is instantaneously presented to the load.

17 Claims, 3 Drawing Sheets

EFFICIENCY ELECTRICAL ENERGY DEVICE

FIELD OF THE INVENTION

This invention relates to electric power delivery in general, and in particular, to savings which may be achieved with both alternating and direct current power delivery systems.

BACKGROUND OF THE INVENTION

Reducing the power loss in electric loads has been a focus of much development for some time. While early work focused on power transmission losses, more recent developments have also addressed power losses in 220 volt and 110 volt residential and commercial site load networks. Power efficiency meters connected between a utility metering device and a residential or commercial load have measured the power loss or efficiency of such a site load network.

It has been found that power loss can be reduced by altering the sinusoidal shape of the 60 cycle voltage supplied by a utility company. The object of such previous work was to reduce the transition time of the voltage from half peak value to half peak value. This was done with 110 volt or 220 volt power supplies connected between a utility metering device and an electric load.

An energy savings device, power supply having an internal dc battery, is disclosed in U.S. Pat. No. 3,319,074 which description is incorporated by reference as if fully set forth herein. The patent describes an external ac source which is rectified and applied to a load under control of a transistor. The dc battery compensates for fluctuations of the ac power source and is maintained in a fully charged condition. The problem with operation of this energy savings device is that, while the power supply is designed to maintain a constant voltage on the load, the power supply introduces additional power losses and does not cope with the varying demands of ac loads, insofar as efficient supply of energy is concerned.

U.S. Pat. No. 4,206,367 to Petruska, et al. shows a 220 volt power supply having an internal dc battery and a charge/discharge circuit which description is incorporated by reference as if fully set forth herein. The energy savings device operates to reduce the power drawn from the utility company supplied external ac source while servicing the residential load. The device is constructed to provide a continuous sinusoidal wave through opposite phase, coupled dc batteries but, due to the inherent delays in the batteries, can only achieve an approximated sinusoidal waveform which is not sufficient to power electric motors and power supplies of modern equipment used in residences and businesses.

Use of the power supply shown in U.S. Pat. No. 4,206,367 to Petruska, in cooperation with electrical loads, has resulted in the increased use of power consumption metering of the power supplied by public utilities to their customers. However, these power use meters presently are unable to accurately measure energy savings actually being attained.

One method of improving the actual, real time measurement of power consumption of the Petruska, et al. patent is the error compensating circuit described in U.S. Pat. No. 5,319,300 to Wood. In the Wood patent, the error compensation or correction circuit includes a pair of capacitors straddling another capacitor or a rechargeable battery source and uses switching transistors to apply an instantaneous voltage level corresponding to the sinusoidal ac supply voltage by controlling the charging and discharging of the voltage storage elements (i.e. the capacitors and battery) which results in an applied reverse current flow to the power metering device furnished by the power company. The applied reverse current flow corrects the power consumption measurement of the metering devices attached across the electrical load.

A residential use or power consumption meter is connected directly to the utility power metering device and uses the 220 volt power supplied at that point to calculate and record (by magnetic rotating dial and hand pointers) the power consumption of the customer. Residential use, while sometimes at 220 volts; e.g. electric ranges and clothes dryers, is primarily delivered at 110 volts. This is accomplished by splitting the three-wire 220 volt supply line into two, two-wire 110 volt subcircuits in the residential distribution box; i.e., the circuit breaker box.

The energy savings device of the Petruska, et al. patent is a 220 volt device which is intended to be connected between the utility power metering device and the residential circuit breaker box. A power consumption meter is a 220 volt device which is intended to be connected between the utility power metering device and the energy savings device of the Petruska, et al. patent. Due to the fact that most (if not all) power consumption meters measure 220 volt current usage across the load to calculate residential power consumption at both 220 volts and 110 volts, an error in calculating the true power consumption can occur.

The ability of the energy savings device in the Petruska, et al. patent to react to changes in current demand was severely limited by the voltage storage devices (i.e. the batteries) which were a part of the error measurement and compensation circuit. The Wood patent makes significant strides forward in the elimination of voltage storage devices with very slow response times by substituting for these devices voltage storage elements with faster response times (i.e. the capacitors of the Wood circuit arrangement) which achieve a significant reduction in response time resulting in a more accurate error compensation for the instantaneous current draw. However, due to the continued use of the complex circuitry arrangement which included, for example, complimentary and opposing current flow compensation circuits, the instantaneous result was not the pure sinusoidal waveform which was desired.

The U.S. Pat. No. 5,637,989 to Wood is an electrical power energy savings circuit for use with 220 volt ac power delivery systems for reducing the power drain of the power delivery system during the "off phase" for each of the 110 volt legs of the ac power supply circuit, as measured across the load. However, this circuit is required to be attached to each 110 volt leg of a 220 volt ac supply line. Additionally, the 5,637,989 patent to Wood required a voltage delay elimination means to provide a current demand following device to constantly monitor the load so that the half wave produced from the dc voltage storage device triggered at the appropriate instant in time. Otherwise, an offset or delay could occur in the sinusoidal waveform applied to the load which would be damaging to ac motors and other similar devices.

What is needed is a more simplified electrical power energy savings circuit means for ac power delivery systems of any voltage having a substantially instantaneous response for delivering a nominal sinusoidal waveform without the need for a current demand following device.

In particular, a further object of the present invention is to provide an electrical power energy savings circuit means for a 220 volt ac power delivery system having a substantially instantaneous response for delivering a nominal sinusoidal waveform.

A further object of the present invention is to incorporate such an improved energy savings circuit means into a residential power supply of the type shown in connection with the error compensation circuit of U.S. Pat. No. 5,319,300.

An additional object of the present invention is to provide a residential power supply with an electrical power energy savings circuit which reduces the 220 volts drawn from the utility company ac voltage supply during 110 volt load usage in a substantially instantaneous manner.

Other objects will appear hereinafter.

SUMMARY OF THE INVENTION

The energy savings circuit or power supply circuit means is to be implemented in combination with an ac source of voltage, an optional electrical power metering means, and an associated electrical load having a power supply circuit for feeding current to the load in alternate half cycles or alternatively, in direct current.

The circuit comprises in combination with an ac voltage source a first circuit means for conducting current in one direction through the load in a first half cycle and a second circuit means for conducting current through the load in the opposing direction in a second half cycle, the first and second circuit means being responsive to the positive and negative cycling of the ac voltage source.

The circuit further comprises a switching control means having a first switch means responsive to the positive half of the sinusoidal voltage waveform from the ac voltage source for energizing the first circuit means and a second switch means responsive to the negative half of the sinusoidal voltage waveform from the ac voltage source for energizing the second circuit means, such that a complete sinusoidal waveform is instantaneously presented to the load.

The circuit means of the power supply circuit means provides a positive half sine wave to the load during the first half cycle and the second circuit means provides a minus half sine wave to the load during the second half cycle of the sinusoidal voltage waveform from the ac power source.

The first circuit means comprises a voltage storage device which is charged during the first half cycle, and the second circuit means contains a voltage storage device which is charged during the second half cycle, so as to provide a substantially instantaneous response for delivering a nominal sinusoidal waveform.

The switching control means further comprises a transformer means coupling the ac voltage source to the switch means for switching said switch means to its conducting condition.

It is also intended with the present invention to optionally provide an error correction circuit means between the electrical power metering means and the improved power supply circuit means of the present invention such that the electrical power metering means measures power usage in direct proportion to the actual electrical load.

Furthermore, the present invention is intended to optionally provide a direct current to the load.

The present invention is intended to be used with any input source ac voltage, but in particular, with an input source ac voltage of approximately 100 to approximately 900 volts ac, and more particularly of approximately 110, 220, 240, 440 or 480 volts ac.

BRIEF DESCRIPTION OF THE DRAWINGS

For the purpose of illustrating the invention, there is shown in the drawings forms which are presently preferred; it being understood, however, that the invention is not limited to the precise arrangements and instrumentalities shown.

DETAILED DESCRIPTION OF THE DRAWINGS

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Figure 1:
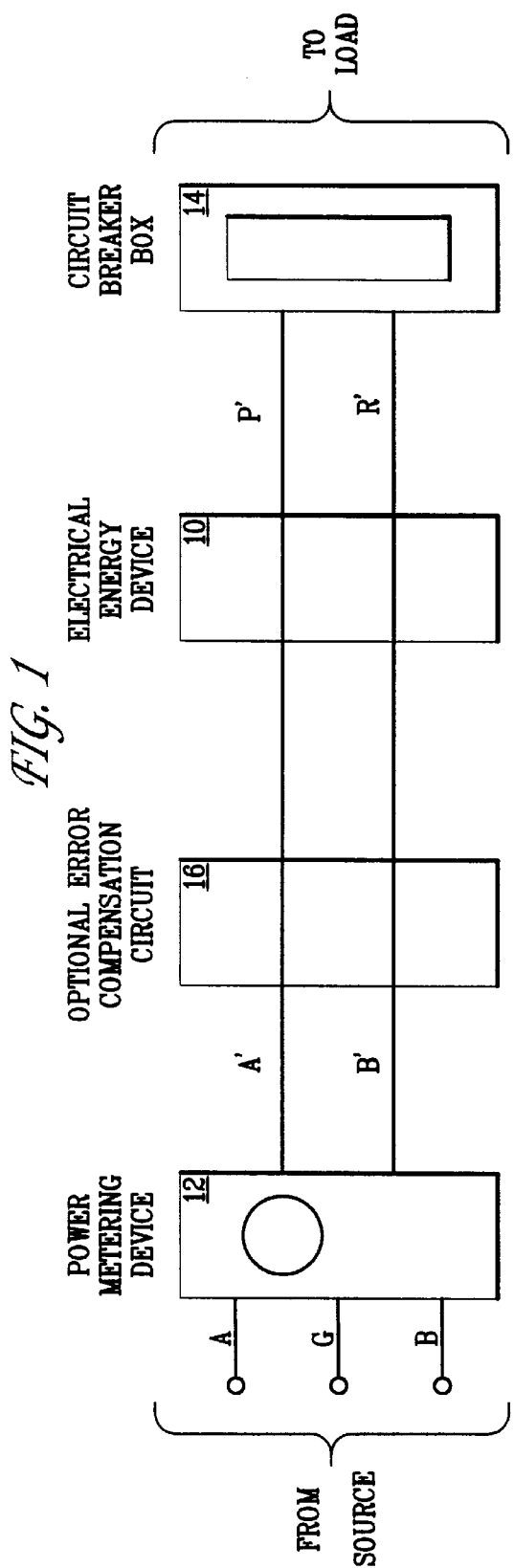
FIG. 1 is a representative block diagram of the electrical power delivery circuit to a residence or commercial establishment including the improved power supply circuit of the present invention.

Referring now to the drawings in detail, where like numerals refer to like parts or elements, there is shown in FIG. 1 the present invention of the improved energy savings circuit means, which is identified, generally, as 10. The energy savings circuit 10 is interposed between the utility power metering device 12 and the residential or commercial circuit breaker box (i.e. the load network) 14. Additionally, the energy savings circuit 10 can follow an error compensation circuit means 16 (such as the error compensation circuit of the Wood patent). The circuit breaker box 14 connects to a variety of individual electrical loads situated within the residential or commercial site, the connections to which are not shown. Also, the power supply source which is connected to the power metering device 12 is indicated only by entry feed lines, A, B and G. The proposed connections and specific usages will be described in greater detail hereinafter.

Figure 2:
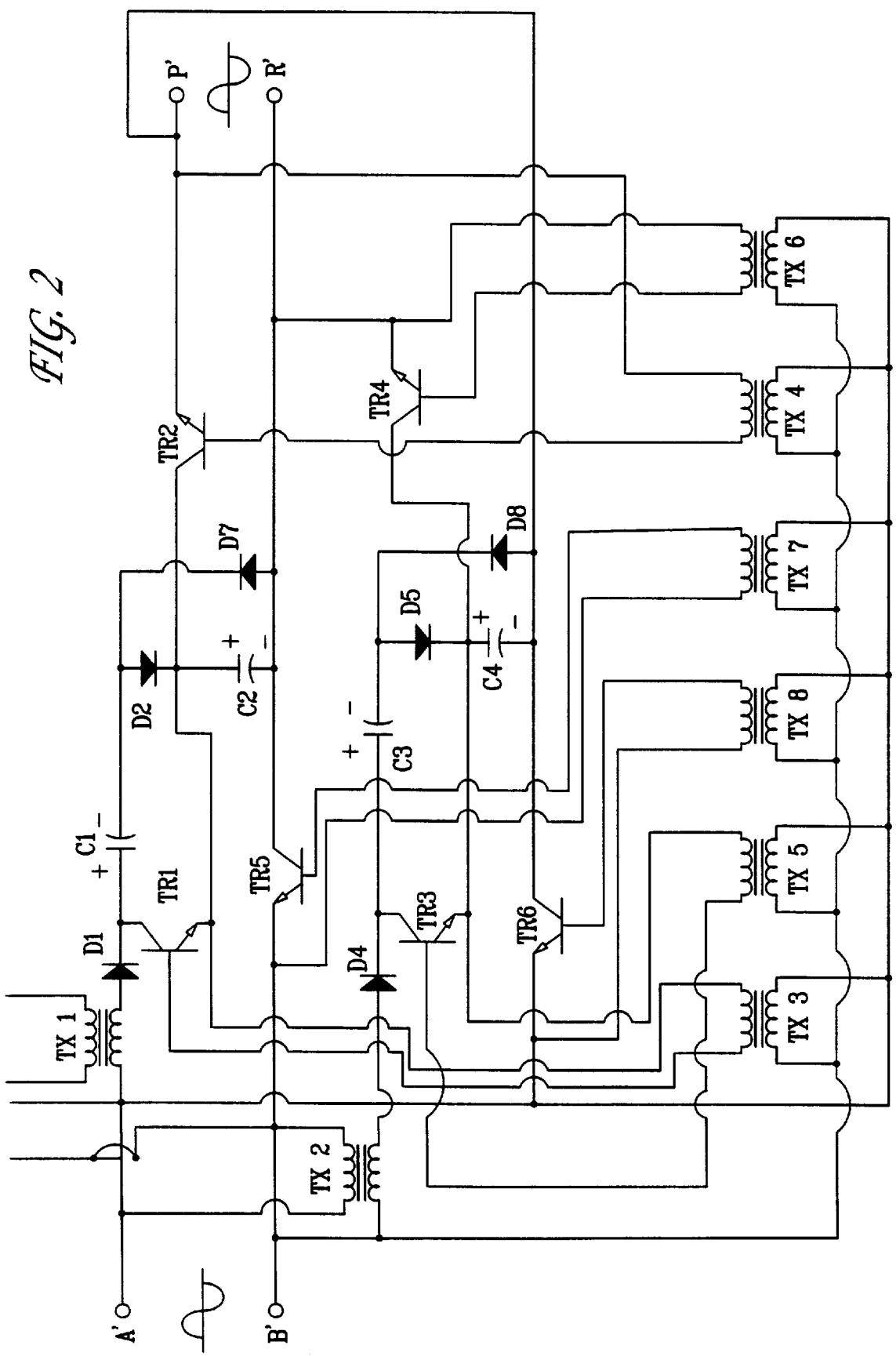
FIG. 2 is a schematic diagram of the improved power supply circuit of the present invention.

With reference to FIG. 2, the energy savings circuit 10 can be described as follows. The external power source from the utility company is delivered to most residential and commercial properties in a 3-wire system carrying 240 volts ac across the two feed lines A, B, with the third line G being neutral. Such wire delivery system usually comes from a step-down transformer connected to the utility company power distribution net. At the entrance to the property receiving the power delivery the utility company terminates its lines in a power metering device such as the meter box 12 of FIG. 1. Exiting the meter box 12 on the private property side of the box is a 3-wire system delivering 240 volts ac as measured between two of its legs A', B' with the third leg G' being ground.

An error compensation circuit 16 of the type described in the Wood patent may be placed following the power metering device 12 to appropriately monitor actual power usage and reflect the unnecessary current so that the power metering device registers only the actual power consumed. The functioning of such error compensation circuit is more fully set forth in the Wood patent. If used, the error compensation circuit produces a 60 Hz 110 ac sinusoidal voltage across the output terminals P, R and that voltage is applied to the input terminals of the energy savings circuit 10 of the present invention.

If an error compensation circuit is not utilized, then the input terminals of the energy savings circuit 10 can be connected across the incoming power supply of the residential/commercial power delivery system entering the property.

In further description of the energy savings circuit means 10 of the present invention, a first and second transformer means TX1 and TX2, respectively are employed to increase by approximately 20 volts ac the voltage provided by power supply lines A' and B', respectively. The transformer means TX1 and TX2 derive their voltage directly from legs A' and B' coming from the power metering device 12. Due to a slight power loss of approximately 20 volts, for the output power to be 220 volts ac, an additional 20 volts must be added to compensate for the loss.

Transformer means TX3 through TX8 are employed to provide approximately 1.0 volts ac to a group of circuit elements. The transformer means TX3 through TX8 derive their voltage directly from legs A' and B' coming from the power metering device 12, as shown in FIG. 2, to apply the desired 1.0 volts ac.

The circuit elements of the energy savings circuit 10 are all indicated by standard symbols. One group of circuit elements which are switched to a conducting state by a signal voltage from one of the transformer means connected to the alternating current source are used during a first half-phase cycle to provide the current conducted through the power source during a first half-phase of each cycle of the alternating current source. During the other half-phase cycle, the alternating current flows through a second group of circuit elements which are switched to a conducting state by a signal voltage from one of the transformer means connected to the alternating current source.

The specific functioning of the groups of circuit elements is as follows. The first half-phase of a single cycle of the alternating current, for purposes of this example will be described as a positive portion of the sinusoidal waveform of the alternating current. When A' goes positive, transistor TR1 is turned off by rendering non-conductive transformer TX3. Simultaneously, the positive half of approximately 240 volts ac is provided to diode D1 and diode D2 which causes capacitor C1 and capacitor C2 each to charge to approximately 155 volts dc. Diode D1 and diode D2, like all of the diodes described in connection with the energy savings circuit means 10, is rated at 600 volts, 1 amp. The capacitor C1, as well as the capacitor C2, like all of the capacitors described in connection with the energy savings circuit means 10 is rated at 400 volts dc, 10,000 $\mu f$.

When A' goes minus, transistor TR1 is turned on by rendering transformer TX3 conductive, putting an additional charge of 1 amp from capacitor C1 into capacitor C2 (utilizing diode D7). Simultaneously with TR1 being turned on, transistor TR2 is turned on by rendering conductive transformer TX4, providing two amps from capacitor C2 to the load. When A' goes plus, transistor TR5 is turned on by rendering conductive transformer TX7 to complete the charging circuit. The transistors TR1 through TR6 are switched on and off using transformers TX3 through TX8, respectively, in a manner well known to those skilled in the art.

Because the positive portion of the wave is produced by discharging capacitor C1 and capacitor C2 (which includes the capacitor C1 charge already added to capacitor C2), the current draw from the power supply is only one half of the positive output current.

Figure 3:
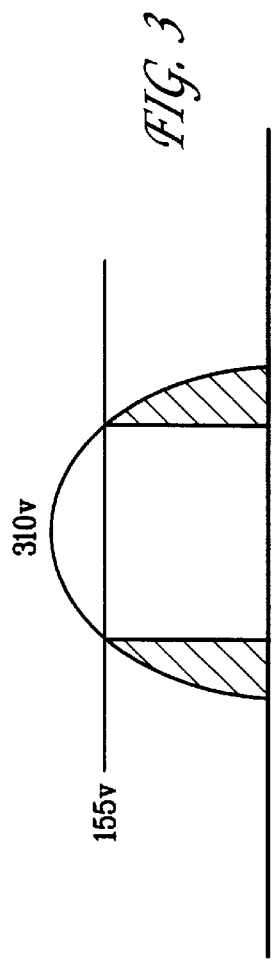
FIG. 3 is a representation of one half of the supply power sine wave.

When viewed on an oscilloscope, the input current from the input power supply only flows on one half of the one half input wave. As shown in FIG. 3, after discharge of capacitor C1 and capacitor C2, there is a charge left in capacitor C1 and capacitor C2 (because they do not completely discharge) totaling approximately 155 volts. Current is not drawn to recharge these two capacitors until the input wave, as seen on the oscilloscope reaches 155 volts and current stops flowing from the input power source as the wave falls below 155 volts. As a result, the power savings will be more than sixty percent.

During the positive half cycle, current will flow through transistor TR2 which has been switched on by rendering conductive transformer TX4. After passing through diodes D1 and D2, capacitors C1 and C2, and transistor TR1 as explained above, the current flows through transistor TR2 to the load. When transistor TR2 is on and transistor TR5 is off, the positive half of the wave is produced. Thus, a current is provided across the terminals P', R' (i.sub.pos) during the positive half sinusoidal wave of the alternating current delivered from the power distribution network of the utility company.

When transistor TR4 is on and transistor TR6 is off, the negative half of the wave is produced by feeding the current in the opposite end of the load. Thus, a current is provided across the terminals R', P' (i.sub.neg) during the negative half sinusoidal wave of the alternating current delivered from the power distribution network of the utility company.

The transformer means TX1 and TX2 have their primary winding connected across the A' and B' legs of the power source, so that approximately 220 volts ac is applied across the input terminals of its primary winding. The secondary winding, which is approximately 20 volts ac, is in series with the input approximate 220 volt ac supply and is used to increase the input power to compensate for the voltage loss of the circuit.

Likewise, the transformer means TX3 through TX8 have their primary winding connected across the A' and B' legs of the power source, so that approximately 220 volts ac is applied across the input terminals of its primary winding. The secondary winding, which is approximately one volt ac controls its associated transistor. In this manner the switching of the current flow is thus provided in the energy savings circuit 10 through the use of the transistors TR1 through TR6, inclusive.

The voltage supplied by the power company and applied across the input legs A' and B' typically varies sinusoidally for each cycle of the alternating current. The alternating current is conducted through diode/transistor circuit containing diodes D1 and D2 and transistor TR5 for charging of capacitors C1 and C2. During discharge of capacitors C1 and C2, the current is conducted through transistors TR1 and TR2 and through diode D7.

The capacitors act as a current collecting or storage device which may either pass the current in a reverse current flow mode or store voltage for assistance in forward current flow through the energy savings circuit means 10. The transistors TR1 and TR2 act merely as switchable control means for the period when each of the capacitors C1 and C2 will conduct current during pre-determined half cycles of the alternating current from the power source.

Transformer means TX3 through TX8 receive 220 volts ac to their primary winding and produce 1.0 volts ac from their secondary winding, applying that voltage to the transistors allowing them to switch on and to conduct current during the half cycle period of the alternating current from the power source in which it is energized.

During the minus part of the output wave, input leg B' goes positive in respect to input leg A'. It is not deemed necessary to provide a complete description of the elements of the negative wave half of the energy savings circuit, as each element will be positioned in the same location in the circuit and serve the identical function as those referenced for the positive part of the output wave. The only difference is the minus part of the wave (i.sub.neg) flows in a reverse direction through the load.

The result of one cycle of operation of the energy savings circuit means 10 is to provide one complete sinusoidal waveform at terminals P', R' (across the load) with an energy savings reduction of approximately sixty percent.

The use of the energy savings circuit means 10 of the present invention greatly reduces the power drain as measured across the load. It is to be observed that the currently described energy savings circuit means 10 provides its energy output (a full wave sinusoidal waveform at 60 Hz and 220 volts ac) without the need for a voltage delay elimination means or for independent power sources or batteries which act as current collection or storage devices. Instead, the energy savings circuit means 10 of the present invention has significantly reduced the necessary elements and control circuit elements such that a consistent symmetrical sinusoidal waveform is produced at the load connection points of the energy savings circuit means 10. The energy savings circuit means 10 provides a smooth, fully symmetrical sinusoidal waveform with no time delay between the positive half and the negative half of the resulting sinusoidal waveform across the load.

Therefore, use of the electrical power consumption energy savings circuit means of the present invention will yield energy savings and, when used with an error compensation circuit, a more accurate residential/commercial power consumption measurement by a 220 volt electrical power consumption meter. It should be appreciated that in order to provide 110 volts ac following use of the present invention, a one to one transformer with a center tap must be utilized.

Figure 4:
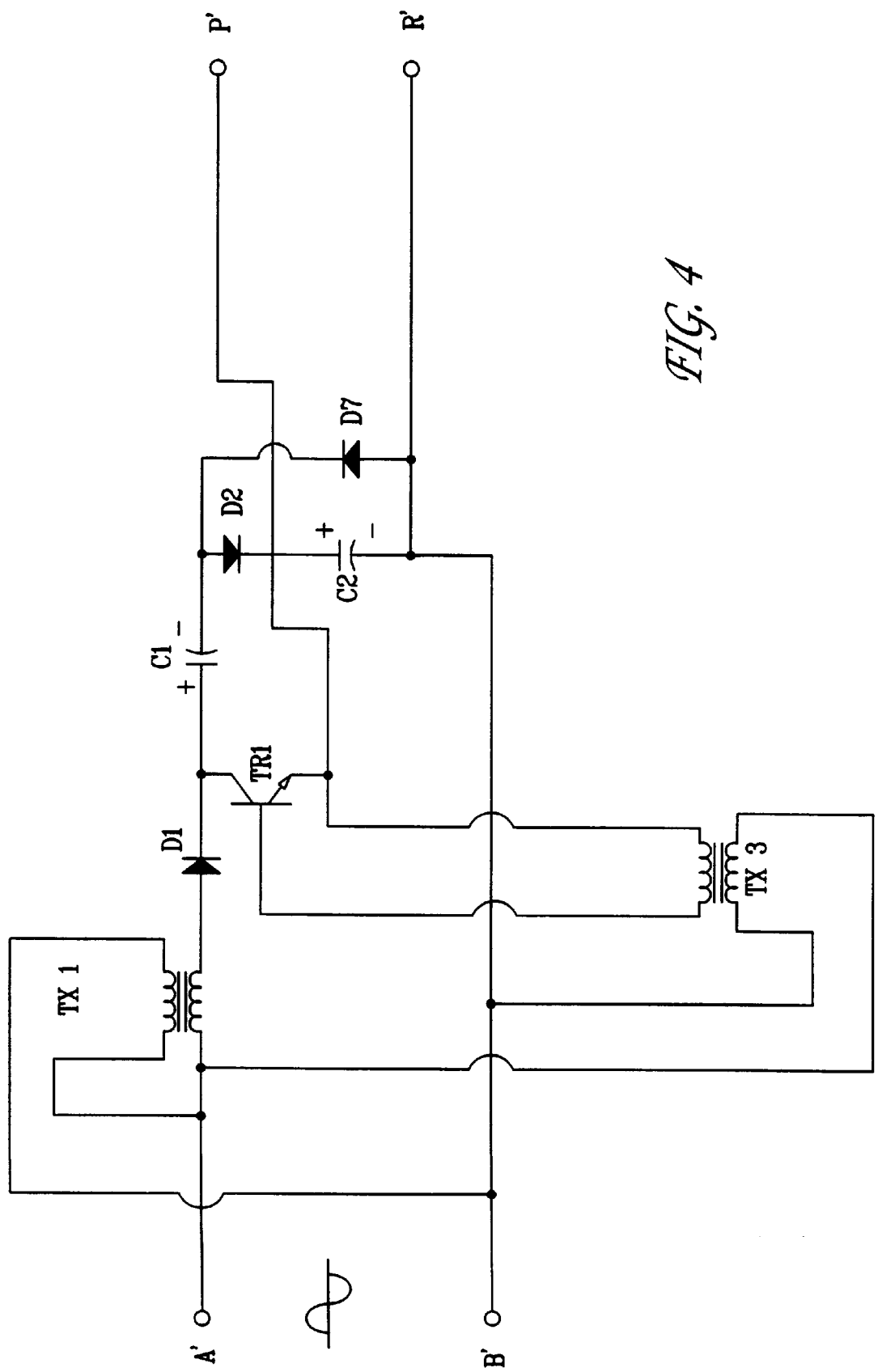
FIG. 4 is a schematic diagram of the improved power supply circuit of the present invention when utilized to provide direct current to the load.

It should also be appreciated that one half of the energy savings circuit means 10 of the present invention, as depicted in FIG. 4 will produce direct current. By eliminating transistors TR2 and TR5 (along with their associated transformers TX4 and TX7) and the circuit associated with leg B', direct current is presented to the load. Conversely, by eliminating transistors TR4 and TR6 (along with their associated transformers TX6 and TX8) and the circuit associated with leg A', direct current is also presented to the load.

The present invention may be embodied in other specific forms (in particular, at differing input power supply voltages) without departing from the spirit or essential attributes thereof and, accordingly, the described embodiments are to be considered in all respects as being illustrative and not restrictive, with the scope of the invention being indicated by the appended claims, rather than the foregoing detailed description, as indicating the scope of the invention as well as all modifications which may fall within a range of equivalency which are also intended to be embraced therein.

I claim:

1. A power supply circuit for conducting current from an ac voltage source to an associated electrical load having a power supply circuit for feeding current to the load in alternate half cycles comprising:

in combination with an ac voltage source and a first circuit for conducting current in one direction through the load in a first half cycle and a second circuit for conducting current through the load in the opposing direction in a second half cycle, the first and second circuits being responsive to the positive and negative cycling of the ac voltage source;

a first switching control responsive to the positive half of the sinusoidal voltage waveform from the ac voltage source for energizing the first circuit and a second switching control responsive to the negative half of the sinusoidal voltage waveform from the ac voltage source for energizing the second circuit;

wherein the first and second circuits each contain at least two voltage storage devices in series such that a first voltage storage device discharges into a second voltage storage device to reduce the line current;

such that a complete sinusoidal waveform is instantaneously presented to the load.

2. The power supply circuit of claim 1, wherein the first circuit provides a positive half sine wave to the load during the first half cycle and the second circuit provides a minus half sine wave to the load during the second half cycle.

3. The power supply circuit of claim 1, wherein the first circuit first voltage storage device comprises a first capacitor and the first circuit second voltage storage device comprises a second capacitor which are charged during the first half cycle; the second circuit first voltage storage device comprises a third capacitor and the second circuit second voltage storage device comprises a fourth capacitor which are charged during the second half cycle; so as to provide a substantially instantaneous response for delivering a nominal sinusoidal waveform.

4. The power supply circuit of claim 1 wherein the first and second switching control each comprises a transformer coupling the ac voltage source to the switching control for switching the switching control to its conducting condition.

5. The power supply circuit of claim 1, wherein the ac voltage source is approximately 100 volts ac to approximately 900 volts ac.

6. The power supply circuit of claim 1, wherein the ac voltage source is approximately 220 volts ac to approximately 240 volts ac.

7. The power supply circuit of claim 1, wherein the ac voltage source is approximately 440 volts ac to approximately 480 volts ac.

8. The power supply circuit of claim 1, wherein the power supply circuit is in further combination with an error compensating circuit.

9. The power supply circuit of claim 1 further comprising an electrical power meter in combination with the ac voltage source.

10. The power supply circuit of claim 1 further comprising at least one transformer in combination with the power source to increase the power supplied to the circuit a predetermined amount.

11. A power supply circuit for conducting current from an ac voltage source to an associated electrical load having a power supply circuit for feeding direct current to said load comprising:

in combination with an ac voltage source and a circuit for conducting direct current through the load, the circuit being responsive to the positive and negative cycling of the ac voltage source;

a switching control responsive to one half of the sinusoidal voltage waveform from the ac voltage source for energizing the circuit;

wherein the circuit contains at least two voltage storage devices in series such that a first voltage storage device discharges into a second voltage storage device to reduce the line current;

such that a direct current is instantaneously presented to the load.

12. The power supply circuit of claim 11, wherein the first voltage storage device comprises a first capacitor and the second voltage storage device comprises a second capacitor which are charged during the first half cycle, so as to provide a substantially instantaneous response for delivering a direct current.

13. The power supply circuit of claim 11 wherein the switching control comprises a transformer coupling the ac voltage source to the switching control for switching the switching control to its conducting condition.

14. The power supply circuit of claim, 11, wherein the ac voltage source is approximately 100 volts ac to approximately 900 volts ac.

15. The power supply circuit of claim 11 further comprising an electrical power meter in combination with the ac voltage source.

16. The power supply circuit of claim 11 further comprising at least one transformer in combination with the power source to increase the power supplied to the circuit a predetermined amount.

17. The power supply circuit of claim 11, wherein the power supply circuit is in further combination with an error compensating circuit.

* * * * *